United States Patent [19]
Flynn et al.

[11] Patent Number: 5,206,778
[45] Date of Patent: Apr. 27, 1993

[54] SENSE CIRCUIT FOR ON-CHIP THERMAL SHUTDOWN

[75] Inventors: Denis M. Flynn, San Jose, Calif.; Peter M. Ippolito, Fishkill, N.Y.

[73] Assignee: International Business Machines Corporation, Armonk, N.Y.

[21] Appl. No.: 701,490

[22] Filed: May 16, 1991

[51] Int. Cl.$^5$ ............................................... H02H 5/04
[52] U.S. Cl. ...................................... 361/103; 361/78
[58] Field of Search ................... 361/103, 87, 93, 106, 361/18, 78; 330/207; 357/28, 35; 323/9

[56] References Cited

U.S. PATENT DOCUMENTS

| | | | |
|---|---|---|---|
| 3,521,167 | 7/1970 | Umemori et al. | 361/103 |
| 3,622,849 | 11/1971 | Kelley et al. | 361/103 |
| 3,906,310 | 9/1975 | Esashika | 323/9 |
| 4,039,928 | 8/1977 | Noftsker et al. | 323/19 |
| 4,418,339 | 11/1983 | Spofford et al. | 340/870.17 |
| 4,538,199 | 8/1985 | Bielinksi et al. | 361/103 |
| 4,667,265 | 5/1987 | Stanojevic et al. | 361/103 |
| 4,669,026 | 5/1987 | Widlar | 361/103 |
| 4,891,729 | 1/1990 | Sugiyama et al. | 361/91 |
| 4,896,199 | 1/1990 | Tsuzuki et al. | 357/28 |
| 4,907,117 | 3/1990 | Pease et al. | 361/54 |

Primary Examiner—A. D. Pellinen
Assistant Examiner—S. Jackson
Attorney, Agent, or Firm—Whitham & Marhoefer

[57] ABSTRACT

An on-chip thermal shutdown circuit senses the average junction temperature of an integrated circuit device. The on-chip circuit generates a signal when the junction temperature exceeds a preset limit. This signal may then be used to control other circuitry such that the electrical shutdown of the integrated circuit device is enabled under conditions of excessive device temperature. In this manner, catastrophic device damage can be avoided and the host system can be notified of the existence of a fault condition.

12 Claims, 3 Drawing Sheets

FIG. 2
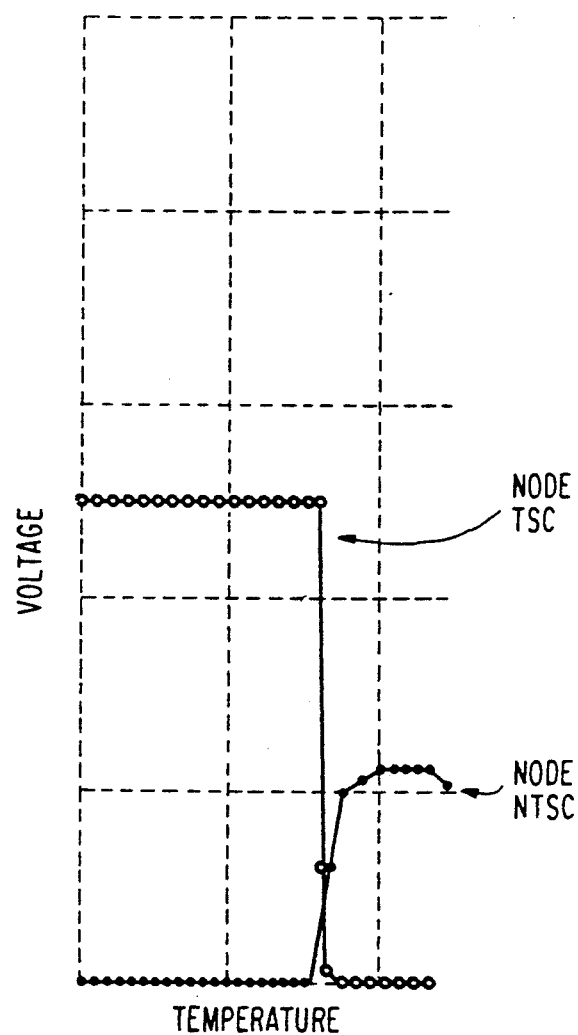
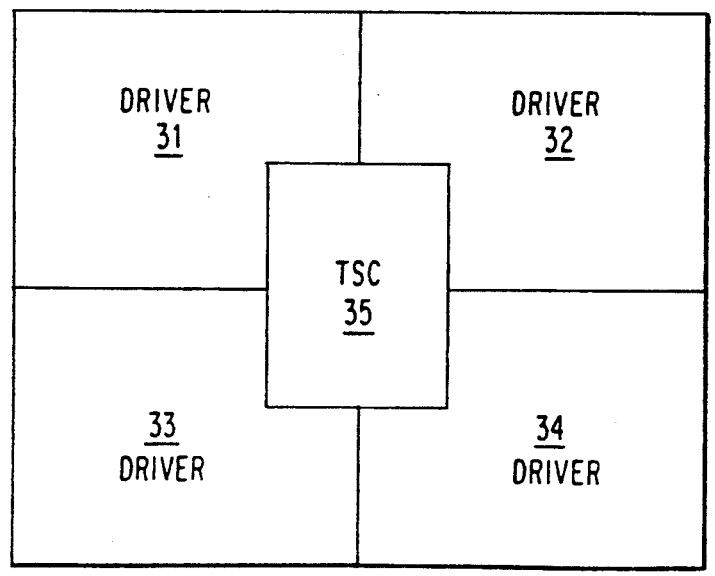
FIG. 4

SENSE CIRCUIT FOR ON-CHIP THERMAL SHUTDOWN

BACKGROUND OF THE INVENTION

1. Field of the Invention

The present invention relates to a sense circuit for integrated circuits to provide on-chip thermal shutdown and an indication of a thermal fault.

2. Description of the Prior Art

The drive towards higher levels of circuit integration levels in integrated circuit (IC) technology has resulted in IC devices which have greater power density levels than ever before. ICs which consume ten watts of power or more are now increasingly becoming the rule rather than the exception. In the event of certain system faults, there is the exposure with these devices that the temperature of the device will exceed the limit beyond which catastrophic device damage may occur. Fault conditions of this type may include the sudden loss of system cooling capability or the unanticipated obstruction of the flow of device cooling medium.

There is also the case of dedicated line driver chips which must be designed to tolerate line fault conditions whereby the driver outputs are inadvertently shorted to the system power supplies. Under these conditions, there is again the exposure that the device temperature will rise above the limit beyond which catastrophic damage occurs.

A circuit that continuously monitors the junction temperature of an IC and senses when a preset limit has been reached would therefore have several advantages. First, the IC may be shut down in the event of a fault so as to avoid catastrophic device damage. Second, by providing a system flag for the shutdown event, it would be possible to notify the system of the existence of the fault condition so that corrective action could be taken.

SUMMARY OF THE INVENTION

It is therefore an object of the present invention to provide an on-chip thermal shutdown circuit which will sense the average junction temperature of the IC device.

It is another object of the invention to provide an on-chip circuit which senses junction temperature and generates a signal when the junction temperature exceeds a preset limit.

According to the invention, there is provided an on-chip shutdown circuit which will sense the average junction temperature of the IC device and which will enable an electrical signal once a preset temperature limit has been exceeded. This electrical signal may then be used to control other circuitry such that the electrical shutdown of the IC is enabled under conditions of excessive device temperature. In this manner, catastrophic device damage can be avoided and the host system can be notified of the existence of a fault condition.

The basic structure of the sense circuit is that of a comparator whose input voltages have a strong and predictable dependence on the local junction temperature. The junction temperature is sensed by first and second strings of junction diodes connected to provide a complimentary increase and decrease in voltages at the inputs of the comparator. A voltage corresponding to a predetermined threshold temperature is preset by appropriate selection of resistance values, this voltage causing the comparator to change states. A detector senses the state of the comparator and generates an electrical signal when a change of state is detected.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a graph showing simulated data illustrating the operation of the circuit shown in FIG. 1;

FIG. 4 is a chip floor plan showing the physical relationship of the circuits shown in FIG. 3.

DETAILED DESCRIPTION OF A PREFERRED EMBODIMENT OF THE INVENTION

Figure 1:
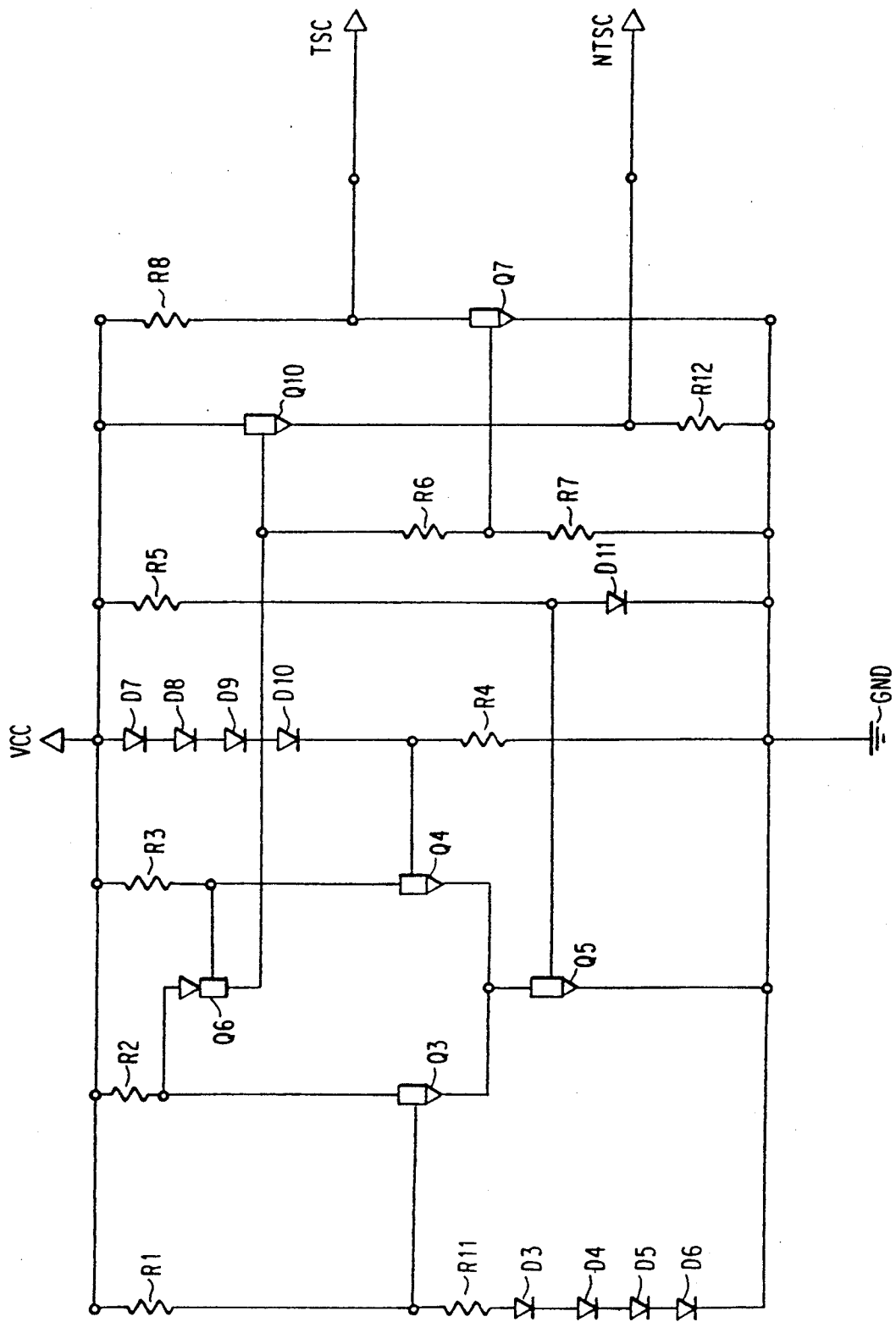
FIG. 1 is a schematic circuit diagram of a preferred embodiment of the invention.

Referring now to the drawings, and more particularly to FIG. 1, there is shown the circuit according to a preferred embodiment of the invention. The basic structure is that of an electrical comparator whose input voltages have a strong and predictable dependence on the local junction temperature.

NPN bipolar transistors $Q_3$ and $Q_4$ are arranged as an emitter-coupled-pair comparator circuit. More specifically, the emitters of transistors $Q_3$ and $Q_4$ are connected in common to the collector of NPN bipolar transistor $Q_5$, the emitter of which is connected to circuit ground. Base bias for transistor $Q_5$ is provided by the voltage divider composed of resistor $R_5$ and junction diode $D_{11}$ connected across voltage source $V_{cc}$ and circuit ground. Load resistors $R_2$ and $R_3$ are respectively connected between the collectors of transistors $Q_3$ and $Q_4$ and voltage source $V_{cc}$.

The input voltage at the base of transistor $Q_4$ is determined by the voltage drop established by the series diode arrangement of junction diodes $D_7$, $D_8$, $D_9$, $D_{10}$ which, together with resistor $R_4$, forms a voltage divider connected across the voltage source $V_{cc}$ and circuit ground. The forward voltage drop of semiconductor diodes is known to have an inverse dependence on the diode junction temperature. Thus, as the junction temperature of these diodes increases, the voltage drop across the series diode arrangement of diodes $D_7$, $D_8$, $D_9$, and $D_{10}$ will decrease, and the voltage present at the base of transistor $Q_4$ will rise.

Similarly, the voltage at the base of transistor $Q_3$ is determined by the voltage divider composed of the series diode arrangement of diodes $D_3$, $D_4$, $D_5$, and $D_6$ and resistors $R_1$ and $R_{11}$, the base of transistor $Q_3$ being connected to the junction of resistors $R_1$ and $R_{11}$. As has been described, the forward voltage drop of the diode string $D_3$ to $D_6$ will have an inverse relation with junction temperature. Thus, as the junction temperature of these diodes increases, the voltage present at the base of transistor $Q_3$ will fall.

With increasing temperature, the voltage at the base of transistor $Q_3$ will trend down with temperature, while the voltage at the base of transistor $Q_4$ will trend up. As a result, the comparator, which is comprised of transistors $Q_3$ and $Q_4$, will change logical states at a given threshold temperature, denoted $T_{sw}$. Through proper design, it is possible to fix the value of $T_{sw}$ to a desired value. The choice of values for resistors $R_1$ and $R_{11}$ sets the nominal value of $T_{sw}$, and by physically locating the diode strings $D_3$ to $D_6$ and $D_7$ to $D_{10}$ within close proximity, it is possible to insure that the value of $T_{sw}$ is repeatable over a wide range of device process and environmental conditions.

PNP bipolar transistor $Q_6$ senses the state of the comparator. Transistor $Q_6$ has its emitter connected to the collector of transistor $Q_3$ and its base connected to the collector of transistor $Q_4$. The collector of transistor $Q_6$ is connected to the base of NPN bipolar transistor $Q_{10}$ connected as an emitter follower with a load resistor $R_{12}$. Transistor $Q_{10}$ drives an output node NTSC. In addition, a voltage divider composed of resistors $R_6$ and $R_7$ is connected across the collector of transistor $Q_6$ and circuit ground. The junction of resistors $R_6$ and $R_7$ is connected to the base of NPN bipolar transistor $Q_7$ having its emitter connected to circuit ground. The collector of transistor $Q_7$ is connected to a load resistor $R_8$, which in turn is connected to the source of voltage $V_{cc}$. The collector of transistor $Q_7$ drives output node TSC.

Transistor $Q_6$ is normally off. Therefore, transistors $Q_7$ and $Q_{10}$ are both in the electrically off state. Output node TSC then assumes a high voltage level, defined as the logical "1" state, and output node NTSC assumes a low voltage level, defined as the logical "0" state. When the average device junction temperature exceeds $T_{sw}$, the comparator comprised of transistors $Q_3$ and $Q_4$ changes logical states. Transistor $Q_6$ is then forced into an electrically on state. With transistor $Q_6$ turned on, transistors $Q_7$ and $Q_{10}$ are both turned on, and the logical states of nodes TSC and NTSC will change. Node TSC will go to a logical "0", while node NTSC will go to a logical "1". This change in state can then be used to enable an electrical shutdown of the device and flag the occurrence of a thermal fault condition.

FIG. 2 shows the simulated performance of the thermal shutdown circuit with $T_{sw}$ set to approximately 175° C. The simulation shows that when the device junction temperature rises through the value of 175° C., nodes TSC and NTSC change their logical states as required.

Figure 3:
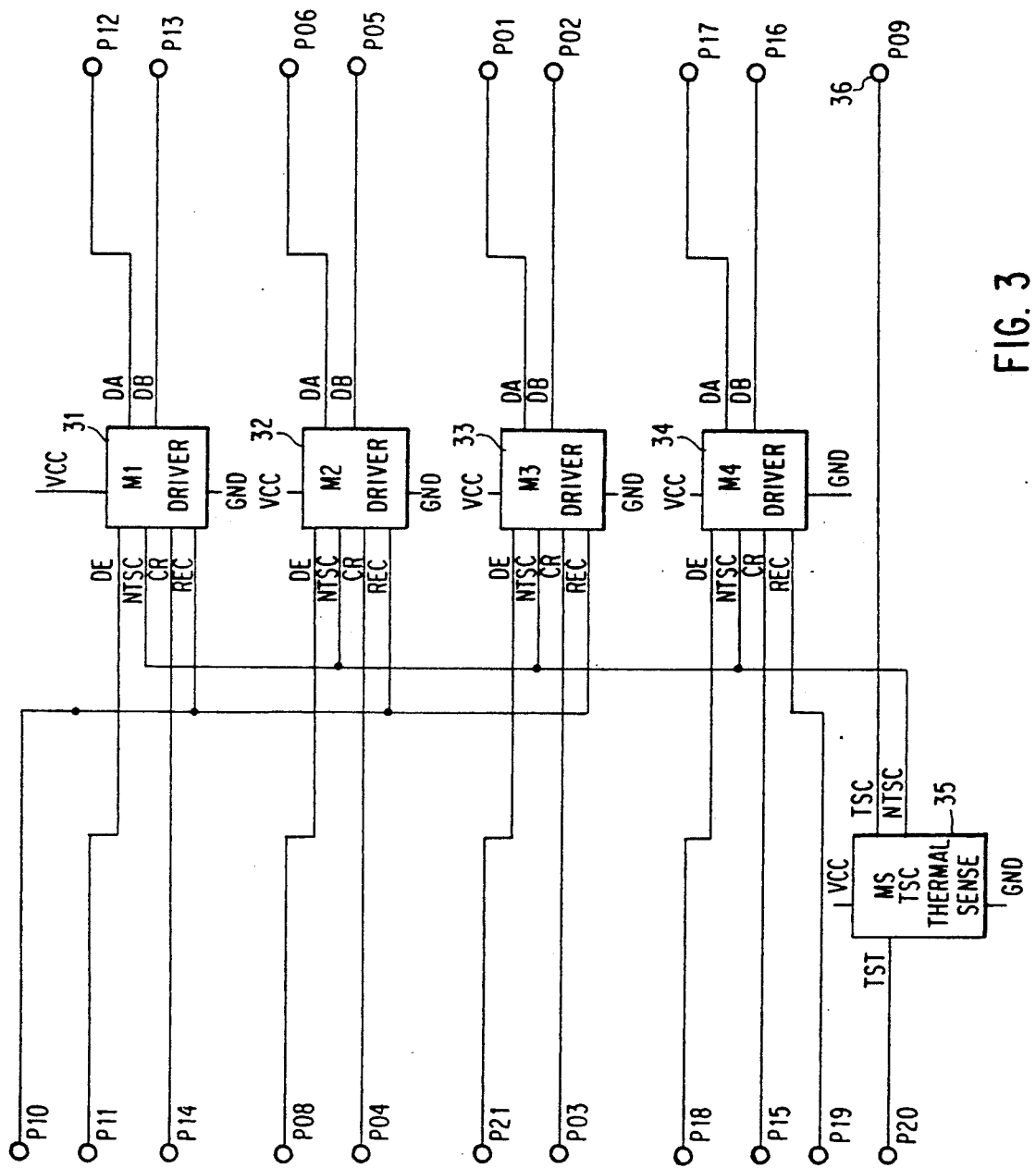
FIG. 3 is a block diagram showing an application of the sense circuit according to the invention.

FIG. 3 is a block diagram of a driver chip wherein each of the blocks 31, 32, 33, and 34 are individual differential driver blocks. The thermal sense circuit 35 according to the invention is incorporated on the driver chip. The NTSC line, connected to the NTSC node in FIG. 1, is used to disable the driver outputs, while the TSC line, which is connected to an external pad 36, is used to provide a flag signal that a thermal shutdown has occurred.

FIG. 4 shows the general floor plan for the physical design of the driver chip shown in block diagram form in FIG. 3. Each of the drivers 31, 32, 33, and 34 are arranged along the outside edge of the chip, as is common practice for driver device design. The thermal sense circuit 35 is located in the center of the chip so that its sensitivity to on-chip thermal gradients is minimized, thus allowing it to better sense the average chip junction temperature.

The application to driver circuits illustrated in FIGS. 3 and 4 is exemplary, and those skilled in the art will appreciate that the thermal sense circuit according to the invention may be used to protect any type of integrated circuit device that requires thermal protection. Therefore, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A sense circuit for on-chip thermal shutdown of an integrated circuit device on a chip comprising:
   comparator means having first and second inputs for sensing a voltage difference at said first and second inputs and switching from a first state to a second state upon a predetermined increase in voltage at said first input and a corresponding predetermined decrease in voltage at said second input;
   temperature sensing means including first and second diode means connected respectively to said first and second inputs of said comparator means, voltage drops across said first and second diode means decreasing with increasing temperature, said first diode means being connected to decrease a voltage at said first input and said second diode means being connected to increase a voltage at said second input with increasing temperature; and
   means connected to said comparator means for detecting the state of said comparator means.

2. The sense circuit recited in claim 1 wherein said first and second diode means respectively comprise first and second strings of junction diodes located proximate one another.

3. The sense circuit recited in claim 2 wherein said temperature sensing means comprises:
   a first voltage divider including said first string of junction diodes connected in series with resistor means across a source of voltage and circuit ground, said first string of junction diodes being connected to circuit ground and said first input being connected to said resistor means; and
   a second voltage divider including said second string of junction diodes connected in series with a resistor across said source of voltage and circuit ground, said second string of junction diodes being connected to said source of voltage and said second input being connected to a junction between said resistor and said second string of junction diodes.

4. The sense circuit recited in claim 3 wherein said resistor means comprises first and second resistors connected in series, said first and second resistors having values chosen for a predetermined threshold temperature, said first input being connected to a junction between said first and second resistors.

5. The sense circuit recited in claim 4 wherein said comparator means comprises first and second bipolar transistors connected as an emitter-coupled pair and generating a differential output corresponding to said first and second states.

6. The sense circuit recited in claim 5 further comprising means connected to said emitter-coupled pair for converting said differential output to a single ended output to drive said means for detecting.

7. The sense circuit recited in claim 6 wherein said converting means comprises a third bipolar transistor of opposite conductivity type to said emitter coupled pair, said third transistor being connected across collectors of said emitter coupled pair and providing said single ended output.

8. The sense circuit recited in claim 6 wherein said means for detecting comprises:

first driver means responsive to said single ended output for generating a first signal to shutdown said integrated circuit device; and second driver means responsive to said single ended output for generating a second signal to a host off-chip circuit to signal the shutdown of said integrated circuit device.

9. The sense circuit recited in claim 8 wherein said first driver means comprises an emitter follower and said second driver means comprises a voltage divider connected between said single ended output and circuit ground and a grounded emitter transistor generating said second signal at its collector.

10. The sense circuit recited in claim 1 wherein said sense circuit is formed at a generally central location on said chip to sense an average temperature of said integrated circuit device.

11. A method for sensing a thermal fault in an integrated circuit device on a chip comprising the steps of:

sensing a voltage difference at first and second inputs and switching from a first output state to a second output state upon a predetermined increase in voltage at said first input and a corresponding predetermined decrease in voltage at said second input;

sensing temperature with first and second diode means connected respectively to said first and second inputs, voltage drops across said first and second diode means decreasing with increasing temperature, said first diode means being connected to decrease a voltage at said first input and said second diode means being connected to increase a voltage at said second input with increasing temperature; and detecting said second output state.

12. The method recited in claim 11 further including providing a thermal shut-down of said chip, said method further comprising the steps of:

generating a first signal to shutdown said integrated circuit device upon detection of said second output state; and generating a second signal to a host off-chip circuit to signal the shutdown of said integrated circuit device.

* * * * *